United States Patent [19]

Gernelle

[11] 4,040,026

[45] Aug. 2, 1977

[54] CHANNEL FOR EXCHANGING INFORMATION BETWEEN A COMPUTER AND RAPID PERIPHERAL UNITS

[76] Inventor: Francois Gernelle, 18 Avenue du Bois, 92290-Chatenay Malabry, France

[21] Appl. No.: 744,793

[22] Filed: Nov. 24, 1976

Related U.S. Application Data

[63] Continuation of Ser. No. 468,298, May 8, 1974, abandoned.

[51] Int. Cl.² .............................................. G06F 9/18
[52] U.S. Cl. ..................................................... 364/900
[58] Field of Search ........................ 340/172.5; 445/1

[56] References Cited

U.S. PATENT DOCUMENTS

| | | | |
|---|---|---|---|
| 3,297,994 | 1/1967 | Klein | 340/172.5 |
| 3,601,809 | 8/1971 | Gray et al. | 340/172.5 |
| 3,699,530 | 10/1972 | Capowski et al. | 340/172.5 |

*Primary Examiner*—Malcolm A. Morrison
*Assistant Examiner*—Errol A. Krass

[57] ABSTRACT

This invention relates to a channel for exchanging information between a computer and rapid peripheral units. Each rapid peripheral unit as well as the bus line of the computer have a direct access to at least one buffer storage, consisting of a stack of sequentially addressable registers. The information to be exchanged between the computer and the peripheral unit are recorded temporarily in the buffer storage, in the stacking order of its registers. Then the previously recorded information is extracted from the buffer storage in the reverse sequential order. This substantially relieves the computer of the processing of inputs and outputs of the peripheral unit. Such a channel is adapted for interconnecting computers and peripheral units operating at considerably different speeds.

6 Claims, 2 Drawing Figures

CHANNEL FOR EXCHANGING INFORMATION BETWEEN A COMPUTER AND RAPID PERIPHERAL UNITS

This is a continuation of application Ser. No. 468,298, filed May 8, 1974, and now abandoned.

FIELD OF THE INVENTION

The present invention relates to channel means for exchanging information between a first computer and rapid peripheral units or a second computer more rapid than said first computer.

DESCRIPTION OF THE PRIOR ART

If the inputs and outputs of the rapid and very rapid peripheral units (such as magnetic tape or disk units, display units, etc.) comprised in a data processing system were processed by the processor proper, only a very short time would be left to this processor to perform the other processing operations, for which it is specially intended.

Considering this specific problem, various attempts have been made with a view to relieving the processor of a computer from this heavy duty, by providing a direct access of rapid peripheral units to live storages or memories provided to this end. In other words, instead of storing temporarily the information issuing from or directed to said rapid peripheral units in registers of the processor, and causing said processor to control the transfer of said information from its registers to the live storages provided to this end, by properly addressing respective areas of said storages, the aforesaid information issuing from or directed to said rapid peripheral units is transferred directly from said peripheral units to said live storage areas, which are to this end "neutralized" with respect to the processor, that is no longer at the disposal of said processor.

Of course, the provisions of this direct access from the peripheral units to said live storages involves the addition of complementary circuits to the live storages concerned, thus increasing their cost and also their manufacturing difficulties.

SUMMARY OF THE INVENTION

A primary object of this invention is to provide information exchange channel means to avoid the above-mentioned inconveniences resulting from the direct access of rapid peripheral units to certain areas of the live storages of a computer.

A second object of this invention is to provide a channel for exchanging information between a first computer and rapid peripheral units or a second computer, more rapid than said first computer, said channel comprising at least one buffer storage consisting of a stack of a number N of independent registers, and having a single access, connected both to said first computer and to the peripheral unit to be operated, and means for sequentially addressing said registers firstly in their stacking order and in synchronism with the information delivered from said first computer or said peripheral unit, then from the last previously addressed register, in a sequential order reverse with respect to said stacking order, and in synchronism either with said peripheral unit operated as an output unit or with a transfer cycle to said first computer.

The buffer storage associated with the channel according to this invention is particularly simple and economical to be manufactured; the information from the first computer or from the peripheral unit to be operated are "stacked" sequentially therein, which is particularly advantageous for the application contemplated, due to the fact that the input and output of any information to and from the rapid peripheral units takes place sequentially, generally in the form of a block of information, consisting of a predetermined number of words. If this number of words is less than or equal to the number N of registers in the stack, the previously recorded information is retrieved, at the time selected by the processor from the last previously addressed register; thus, the information retrieved first, is the information recorded last.

Of course, the sequential addressing of the various registers of the buffer storage equipping the channel according to this invention may take place automatically, that is, nearly without any intervention of the processor, so that the processor is substantially relieved of the processing of inputs and outputs of the rapid peripheral units, this being obtained without adding sophisticated and expensive circuits to the live storages or memories of the computer.

In a preferred embodiment of the channel according to the present invention the means for sequentially addressing the register stack comprises a register counter and means for incrementing or decrementing this counter by one unit, from the leading edge of a pulse controlling the input of an information into the stack, or from the trailing edge of another pulse controlling the output of an information therefrom; these input and output control pulses are transmitted from control circuits each adapted to connect one rapid peripheral unit to the single access of the register stack. The processor is effective only for either releasing a transfer cycle via said respective control circuit, or for interrupting this transfer cycle.

BRIEF DESCRIPTION OF THE DRAWING

A typical embodiment of a data processing system equipped with a plurality of channels according to this invention for exchanging information with rapid peripheral units will now be described by way of example with reference to the accompanying drawing, in which.

DESCRIPTION OF THE PREFERRED EMBODIMENT

Figure 1:
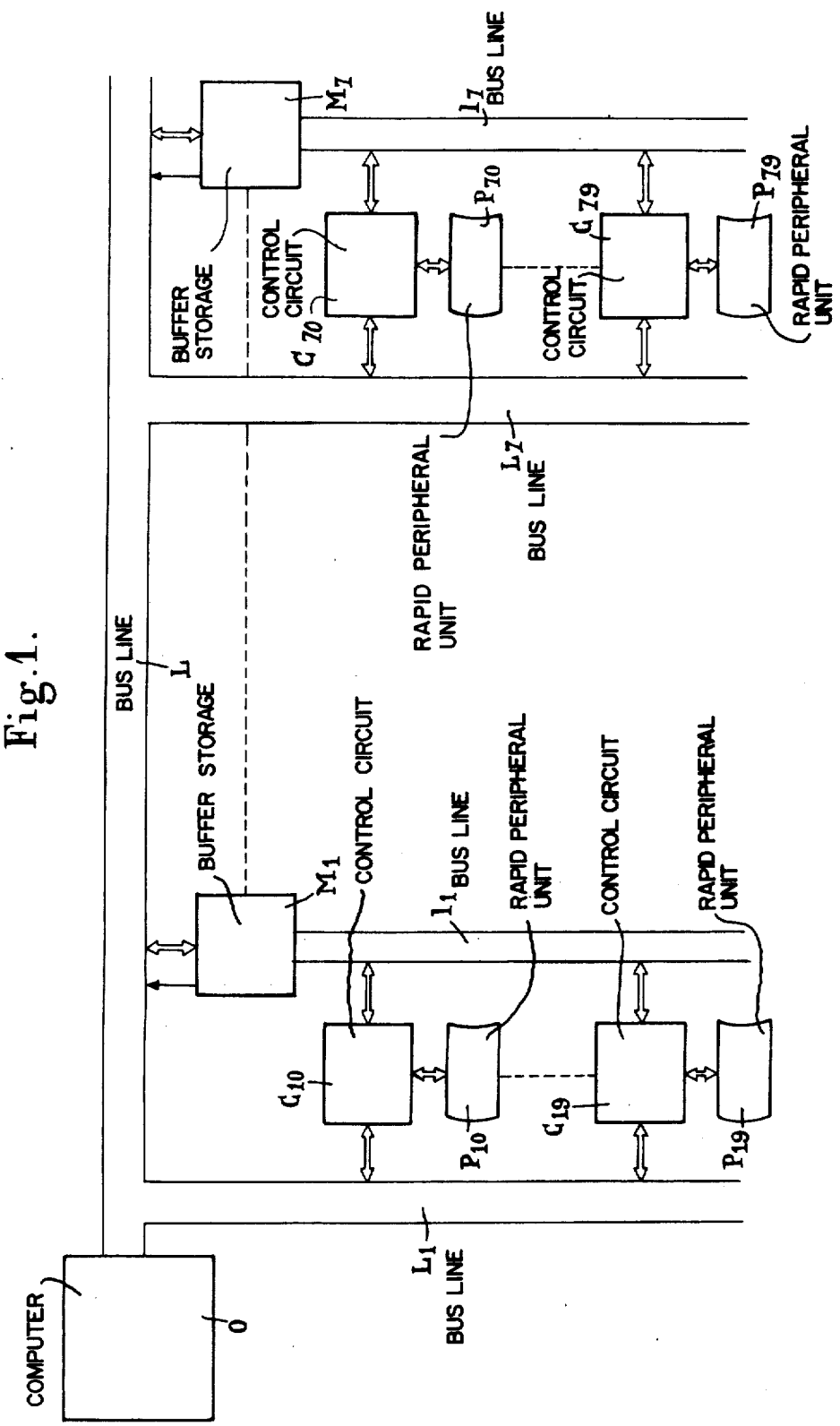
FIG. 1 is a general diagram illustrating a data processing system equipped with channels according to this invention.

In FIG. 1, the black box O is a computer, which may be of any suitable type, adapted to exchange information notably with peripheral units via a bus line L, to which a plurality of peripheral units operating at a relatively slow rate, such as punched-card readers (not shown) are adapted to be connected in parallel, notably directly. On the other hand, this FIG. 1 illustrates diagrammatically several series, notably seven series, of rapid peripheral unit $P_{10}$, $P_{11}$ . . . $P_{19}$, $P_{20}$ . . . $P_{29}$ . . . $P_{70}$, $P_{71}$ . . . $P_{79}$, which cannot be connected directly to the bus line L of said computer. These rapid peripheral units consist for example of magnetic tape or disk apparatus, display consoles, optical-reading apparatus, etc.

Figure 2:
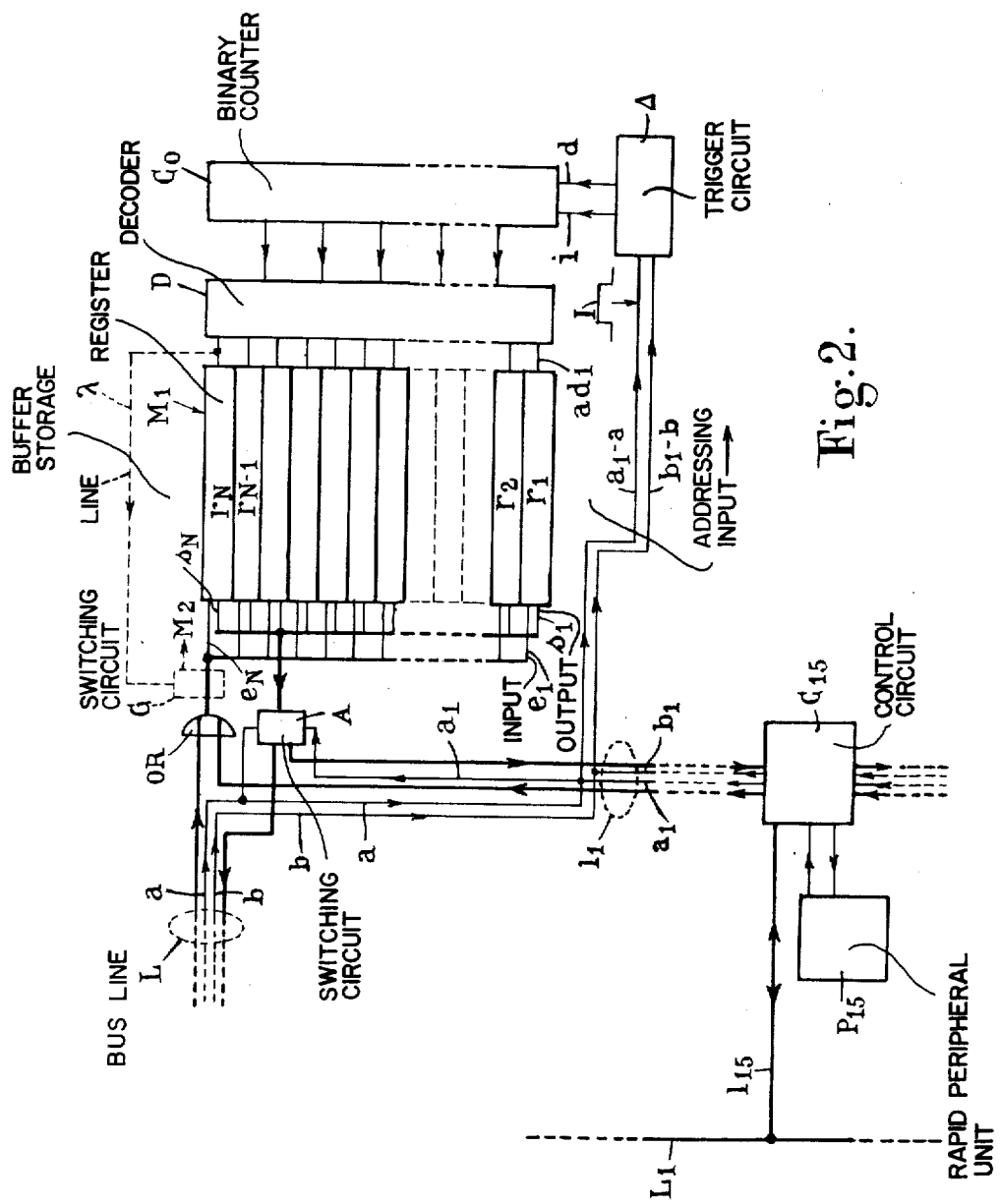
FIG. 2 is a block diagram illustrating the structure of one of the information exchange channels provided in the system of FIG. 1.

According to this invention, a buffer memory $M_1$, $M_2$ . . . or $M_7$, of which the structure and mode of operation will be described presently with reference to FIG. 2, is associated with each one of said series of peripheral units, such as $P_{10}$ to $P_{19}$, respectively.

Each buffer storage $M_1$ to $M_7$ is adapted to exchange information on the one hand with computer O via said bus line L and on the other hand with each one of the peripheral units of the corresponding series through a channel bus line $l_1$, $l_2$ ... or $l_7$. Each peripheral unit of a same series is connected to the bus line of the corresponding channel, not directly but through the medium of a control circuit $C_{10}$, $C_{11}$ ... $C_{19}$, $C_{20}$ ... $C_{71}$ ... or $C_{79}$, which may in turn exchange information with the computer O via branchings $L_1$, $L_2$ ... or $L_7$ of its bus line L. In FIG. 1 the two-point arrows designate links permitting the transfer of information in either direction. Although each buffer storage $M_1$ to $M_7$ seems to have two accesses, one connected to the bus line L of computer O, the other to the bus line, for instance $l_1$, of the relevant channel, it will be seen during the following description of FIG. 2 that in fact these two accesses are merged into one in the embodiment of the buffer storages $M_1$ to $M_7$ utilized in the present invention.

FIG. 2 illustrates diagrammatically the structure of anyone of said buffer storages $M_1$ to $M_7$ of FIG. 1, notably that of storage $M_1$. This buffer storage $M_1$ comprises essentially a number N of separate registers $r_1, r_2, \ldots r_N$ identical with each other and having notably the same capacity (for instance 8 bits = 1 octet). These various registers $r_1$ to $r_N$ may be embodied in different ways, for example in the form of magnetic tores; however, integrated registers of the MOS type are particularly suited for this application, due to their small dimensions (large scale integration) and their very short access time.

The writing-in inputs such as $e_1$ of all the N registers are connected in parallel to the outputs of a logic OR-circuit having a first group of inputs connected to the wires of the bus line L which are intended for transferring information in the direction of the buffer storages such as $M_1$, a second group of inputs of said OR-circuit being connected to the wires of the channel bus line $l_1$ which correspond likewise to the transfer of information in the direction of the buffer storage $M_1$. Similarly, the reading outputs such as $s_1$ of all registers $r_1$ to $r_N$ are connected in parallel to the inputs of a switching circuit A of which a first and second series of outputs are connected to the wires of bus lines L and $l_1$, respectively, provided for transferring information from said buffer storages, such as $M_1$. The switching of information transmitted to the inputs of said switching circuit A to its first or second group of outputs is controlled by information transmitted via wires $a$ and $a_1$, respectively, of bus lines L and $l_1$. The addressing inputs such as $ad_1$ of the various registers $r_1$ to $r_N$ are connected to the N outputs of a decoder D, respectively, the inputs of this decoder D being connected to the various stages of a binary counter $C_O$ having a capacity at least equal to N. This binary counter $C_0$ comprises an incremental input $i$ and a decremental input $d$ connected to corresponding outputs of a trigger circuit $\Delta$ having a function to be described presently.

Issuing from each control circuit such as $C_{15}$ interposed between one of the rapid peripheral units such as $P_{15}$ and the channel bus line $l_1$, which control circuit can receive instructions from the computer only through a line $l_{15}$, are two conductors $a_1$ and $b_1$ leading to a pair of separate control inputs of trigger circuit $\Delta$, the first conductor $a_1$ being also connected to one of the control inputs of the switching circuit A, as already explained in the foregoing.

The system illustrated in FIGS. 1 and 2 and described hereinabove is operated as follows:

When the instruction "reading the peripheral unit $P_{15}$" is read in the memory containing the progamm of computer O, this computer, via a branch section $L_1$ of its bus line L and line $l_{15}$, delivers to said control circuit $C_{15}$ an order for starting a read-out cycle for an information block of at the most N 8 bit-words present in the peripheral unit $P_{15}$, which consists for example of a magnetic tape apparatus. The control circuit $C_{15}$ comprises, in a manner known per se, means (of which the description is not deemed necessary herein) for subsequently performing the complete reading operation concerning the information blocking the magnetic tape of said apparatus $P_{15}$, the information thus read being transferred to the buffer storage $M_1$ without any further action of computer O. Each control circuit such as $C_{15}$ may be embodied in many different ways, i.e. with wide variations, especially with a view to adapt same to the specific character of the corresponding peripheral unit, notably $P_{15}$; in any case, these various control circuit structures are not included in the scope of the present invention. The only requirement to be set is that each control circuit such as $C_{15}$ comprises means for delivering via wire $b_1$ a rectangular pulse I of which the leading edge occurs slightly before the transmission of a word and the trailing edge just follows the end of this transmission. Besides, the trigger circuit $\Delta$ is constructed in a manner known per se and such that it will transmit a pulse to the incremental input $i$ of binary counter $C_O$ when the leading edge of said rectangular pulse I appears on said wire $b_1$. Then, if when the control circuit $C_{15}$ receives the readout order from the computer the buffer storage $M_1$ and the binary counter $C_O$ are completely empty, (i.e. with all the binary counter stages in their zero state or positions), the leading edge of the first pulse I delivered to wire $b_1$ from said control circuit $C_{15}$ causes a signal to be delivered from trigger circuit $\Delta$ to the incremental input $i$ of said counter $C_O$, so that its first stage subsequently assumes the state "1", thus causing the first output of decoder D and consequently the addressing input $ad_1$ of the first register $r_1$ of stack $M_1$ to be activated. Under these conditions, it is clear that the first 8-bit word read out from the magnetic tape of apparatus $P_{15}$ is transmitted to this register $r_1$ during the time of said rectangular pulse I, via control circuit $C_{15}$, the corresponding wires of bus line $l_1$, the OR-circuit and the writing-in input $e_1$ of said register $r_1$. The next rectangular pulse I delivered by control circuit $C_{15}$ to wire $b_1$ is attended by another increment in the position of binary counter $C_O$, whereby the second output of decoder D is activated and addresses the second register $r_2$ of stack $M_1$. This second register $r_2$ will thus record the second 8-bit word read out from the magnetic tape of apparatus $P_{15}$. If the information block to be read out comprises a number of words $p$ inferior to N, this information block transferred to the buffer storage $M_1$ will occupy the first $p$ "stages" of this storage.

The end of the transfer may be signalled to the computer O through the control circuit $C_{15}$ via a wire of line $l_{15}$ and branch line $L_1$ of bus line L.

When, at any time after the completion of the above-described transfer operation, the programm in progress in computer O requires another transfer of the information block originating from the peripheral unit $P_{15}$, for example to special-purpose registers for said computer O, the latter delivers, via wire $a$ of its bus line L, which leads to the same input of trigger circuit $\Delta$ as the wire $a_1$ extending from a control circuit such as $C_{15}$, successive rectangular pulses I each adapted on the one hand, throughout its duration, to switch information available at the inputs of switching circuit A to its first output group, i.e. to the corresponding transfer wires of bus line L, and on the other hand, when its trailing edge appears, to activate the decremental input $d$ of binary counter $C_O$. Thus the leading edge of the first one of said successive pulses I exerts no influence whatsoever on content of binary counter $C_O$, so that the latter will consequently address via decoder D the last previously addressed register $r_p$, of which the content is then transferred from its read-out output $s_p$ to the corresponding register of computer O, via the switching circuit A and transfer wires of bus line L, connected to the first series of outputs of A. Upon completion of the transfer to said computer O of the last word previously recorded in the buffer storage $M_1$, the trailing edge of rectangular pulse I activates the decremental input of counter $C_O$, whereby the content thereof is reduced by one unit, with the consequence that the register $r_{p-1}$ of said buffer storage $M_1$ is addressed through the medium of decoder circuit D. When the next rectangular pulse I appears on wire $a$, the second word recorded in register $r_{p-1}$ is transferred to the computer under the above-described conditions. The various words of the block temporarily recorded in the buffer storage $M_1$ are thus transferred to the computer registers but in the reverse order, compared with the sequential order in which they had been read out from the magnetic tape of apparatus $P_{15}$; however, this is not objectionable since each one of the various words temporarily recorded in said buffer storage $M_1$ is then transferred to a predetermined register or to a storage area having a predetermined address in computer O, this addressing permitting the safeguarding of the normal sequential order of the words previously transmitted from the peripheral unit.

The system illustrated in FIGS. 1 and 2 is also suitable for transferring information for example from registers of said computer O to a fast peripheral unit such as $P_{15}$. Assuming again that the buffer storage $M_1$ is completely empty or free, and that the content of counter $C_O$ is still zero before the transfer begins, it is only necessary that the computer O delivers successive pulses I via wire $b$ of its bus line L, leading to the same input of trigger circuit $\Delta$ as wire $b_1$, for causing the leading edges of said pulses I to gradually increment the contents of counter $C_O$ and to address in succession the registers $r_1, r_2 \ldots$ of buffer storage $M_1$, in which the various words of the information block contained in the registers of computer O are successively transmitted via the logic OR-circuit. The second phase of this transfer is controlled by delivering to the wire $a_1$, via control circuit $C_{15}$, successive pulses I each adapted on the one hand, throughout its duration, to switch the information available at the inputs of switching circuit A to its second series of outputs, and on the other hand, by means of its trailing edge, to decrement the content of counter $C_O$.

Of course, each buffer storage such as $M_1$ (provided that it has a sufficient number N of independent registers), may receive in succession a more or less considerable nubmer of information blocks either from a same peripheral unit such as $P_{15}$, or from a plurality of peripheral units connected to bus line $l_1$. Of course, the end of each of the information blocks recorded in succession in a same buffer storage such as $M_1$ must be memorized, for example in the form of the serial number of the stage in which its last word was recorded. The subsequent retrieval of anyone of the information blocks thus "stacked" in the buffer storage is only subordinate to the preliminary decrement of the binary counter $C_O$ by a number of units sufficient to re-activate the output of decoder D, which is connected to the addressing input of the register having this number; the next retrieval takes place in the manner already described hereinabove and terminates when the content of said binary counter $C_O$ has decreased to a value corresponding to the serial number of the stage where the last word of the preceding information block was recorded. The material means necessary for automatically implementing these operations are not illustrated and their detailed description has not been deemed necessary, since they are within the ordinary skill of those conversant with the art.

A computer equipped with a plurality of information exchange channels according to the present invention, such as illustrated in FIG. 1, is attended by many advantageous features. Thus:

Each channel $l_1, l_2 \ldots l_7$ (of which the number is selected arbitrarily) to which a specific buffer storage $M_1$, $M_2 \ldots$ or $M_7$ is associated, operates independently of the other channels, so that the total rate of transfer of the system, with respect to its rapid peripheral units, is equal to the product of the number of channels by the rate of transfer of each of them, which may be as high as one million octets per second, corresponding to a maximum transfer rate of 56,000,000 bits per second in a 7-channel system; this very considerable total rate of transfer is obtained by using relatively simple technicial means.

On the other hand, if one provides a plurality of channels, each adapted for example to transfer $n = 8$ bits in parallel, it is possible to accomplish information exchanges with rapid peripheral units which are adapted for transferring in parallel a number of bits greater than $n$; to this end, means are provided according to this invention for connecting in parallel a suitable number of channels to each rapid peripheral unit, adapted for the parallel transfer of a number of bits greater than $n$.

By providing a plurality of information exchange channels it becomes also possible to overstep the N-word limit capacity afforded by the buffer storage having N independent registers, which is associated with each channel. To this end, there are provided according to the present invention means for transferring the words of a block for which no room was available in the buffer storage of a channel, to the buffer storage of one or several other channels, and for recording the addresses of the portions of a same information block which are registered in different buffer storages, said means being controlled by successive control signals, each generated by a buffer storage when fully loaded. Thus, FIG. 2 shows in dash lines a switching circuit G inserted between the output of the OR-circuit and the parallel-connected inputs $e_1$ to $e_N$ of the various registers $r_1$ to $r_N$ of buffer storage $M_1$. When the register $r_N$ of the last stage of this buffer storage is charged, a line $\lambda$ branched for instance off the addressing line of register $r_N$ transmits a control signal to said switching circuit G, of which the second series of outputs will subsequently transmit all the information available on the outputs of the OR-circuit to the inputs of the corresponding OR-circuit associated with the second buffer storage $M_2$ (not shown in FIG. 2). Thus, the information which it has not been possible to introduce into buffer storage $M_1$ can be transferred step by step to the nearest buffer storage of which some of the upper stages are still free. Under these conditions, it may happen that various parts of a same information block are recorded temporarily in two or even a higher number of different buffer storages, and of course means must also be provided for recording the addresses of those portions of said information block which are registered in different buffer storages; these addresses are subsequently utilized for the retrieval operation, which takes place invariably by beginning with the stage of the buffer storage where the last word from said information block had been registered. It is not necessary to describe the logic process on which these operations are based, for this will be readily apparent to those skilled in the art; this also applies to the material construction of the means necessary for accomplishing such operations. This arrangement is also applicable in the specific case already mentioned hereinabove wherein mmore than one buffer storage is utilized for temporarily recording words of a size in excess of the capacity of a buffer-storage register.

One or a plurality of information exchange channels according to this invention may also be provided for interconnecting a first computer and a second computer faster than said first computer; besides, it is also known that in many cases some of the above-mentioned rapid peripheral units may consist of small computers.

The foregoing also disclosed that the computer O is adapted, via a branching $L_1$ is its bus line L and a wire of line $l_{15}$, to release a readout or recording cycle, for example from or to the magnetic tape of apparatus $P_{15}$, by means of a control circuit $C_{15}$, and that this control circuit $C_{15}$ is adapted likewise to confirm to the computer O the completion of the read-out or recording cycle. Alternatively, the computer O may also through the same means control under real-time conditions the read-out or recording cycle, and possibly discontinue same. However, inasmuch as an exchange of information or data between a peripheral unit such as $P_{15}$ and the buffer storage $M_1$ of the corresponding channel does not require any action from the computer, the read-out or recording cycle may be released directly by the control circuit $C_{15}$, for example on request of the peripheral unit $P_{15}$ or another peripheral unit; in this last instance, however, the computer O is to be informed at least of the completion of this read-out or recording cycle.

What I claim as new is:

1. A channel for exchanging information in the form of blocks of at least one word, between a computer performing operations under the control of a programme and at least one rapid peripheral unit accessible through at least one control circuit means for extracting the information blocks from at least one peripheral unit, in response to readout orders delivered thereto, and for recording the information blocks in at least one peripheral unit, in response to write-in orders delivered thereto, the computer including specialized registers and being operatively arranged to deliver the readout orders and the write-in orders to at least one control circuit means, said channel comprising, in combination:

at least one buffer memory consisting of a stack of N independent registers referenced by serial numbers assuming all values from 1 to N, each one of said independent registers including a write-in input and a readout output, and being operative to store an information word, so as to become a full register, and to read out such information word so as to become an empty register;

a logic OR circuit including an output connected to said write-in inputs of all said registers of said buffer memory and including at least two inputs, the first one being connected to said computer and the second one to said at least one rapid periphral unit via said at least one control circuit means;

a switching circuit including an input connected to the readout outputs of all the registers of a same buffer memory, first and second outputs connected respectively to said computer and to said at least one rapid peripheral unit via said at least one control circuit means, and first and second switching terminals to be activated by a signal of rectangular shape having a leading edge and a trailing edge for connecting, throughout duration of the signal of rectangular shape, said input of said switching circuit to said first output and second output of said switching circuit, respectively;

addressing means including, for each memory, a trigger circuit having two inputs and two outputs, these two outputs being connected to a counter containing a next lower integer preceding immediately the serial number of that empty register having a lowest serial number, said counter being connected to a decoder having outputs each connected to one of the registers of said memory, each decoder output when energized opening access to that register of said buffer memory to which it is connected;

said trigger circuit including means for producing, upon occurrence of the leading edge of one of the signals of rectangular shape at its second input, a single incrementation signal delivered to its second output for up counting one unit in said counter, and means for producing, upon occurrence of the trailing edge of one of the signals of rectangular shape at its first input, a single decrementation signal delivered to its first output for down counting one unit in said counter;

said control circuit means including means for delivering in response to one of said readout orders transmitted from said computer and concerning one word of information, one of the signals of rectangular shape to the second input of said trigger circuit in order to store, in said empty register having the lowest serial number, the word transmitted through the second input of said logic OR circuit, said control circuit means further having means for delivering simultaneously to the first input of said trigger circuit and to the second switching terminal of said switching circuit, in response to a write-in order transmitted from said computer and concerning one word, one of the signals of rectangular shape to permit the storage, in said at least one peripheral unit, of the information word contained in a full register having a next lower serial number preceding immediately the serial number of said empty register having the lowest serial number.

2. A channel for exchanging information according to claim 1, wherein said computer includes means for simultaneously delivering, when its programme involves a word of information which was previously stored in said buffer memory, one of the signals of rectangular shape to said first switching terminal of said switching circuit and to said first input of said trigger circuit, for transferring to its specialized registers the information word contained in said full register having the next lower serial number preceding immediately the serial number of said empty register having the lowest serial number;

said computer further including means for delivering, when its programme requires the storing of an information word contained in its specialized registers into said buffer memory, an aforesaid signal of rectangular shape to said second input of said trigger circuit, in order to store, in said empty register having the lowest serial number, the information word transmitted through said first input of said logic OR circuit.

3. In a data processing system, a plurality of channels as set forth in claim 1, for exchanging information between a computer and at least one peripheral unit, wherein the information words readout from or recorded in at least one peripheral unit each include Q bits, wherein the information words stored in said registers of said buffer memory each comprise $q$ bits and wherein, in order to obtain information exchange between said computer and each one of said at least one peripheral unit, the number of said channels is equal to the next higher integer following $Q/q$.

4. In a data processing system, a plurality of channels as set forth in claim 1, for exchanging information between a computer and at least one peripheral unit, wherein the information words readout from or recorded in at least one peripheral unit each include Q bits, wherein the information words stored in said registers of said buffer memory each comprise $q$ bits and wherein, in order to obtain information exchange between said computer and each one of said at least one peripheral unit, the number of said channels is equal to the next higher integer following $Q/q$.

5. In a data processing system having a computer performing operations under the control of a programme, at least one rapid peripheral unit accessible through at least one control circuit means for extracting information in form of blocks of at least one word from said at least one peripheral unit, in response to readout orders delivered thereto, said computer having specialized registers and means for delivering the readout orders to said at least one control circuit means, a channel comprising, in combination:

a plurality of buffer memories referenced by serial numbers each one consisting of a stack of N independent registers referenced by serial numbers assuming all the values from 1 to N, each one of said independent registers including a write-in input and a readout output, and being operative to store an information word, so as to become a full register, and to read out such information word so as to become an empty register;

a plurality of logic OR circuits each including an output connected to the write-in inputs of all said registers of a respective one of said buffer memories and at least two inputs the first one being connected to said computer and the second one to at least said one rapid peripheral unit via at least said one control circuit means;

addressing means including for each memory, a trigger circuit having at least one input and one output, said at least one output being connected to a counter containing a next lower integer preceding immediately the serial number of that empty register having a lowest serial number, said counter being connected to a decoder having outputs each connected to one of the registers of one of said memories, each decoder output when energized opening access to that register of said buffer memory to which it is connected;

said trigger circuit including means for producing in response to a leading edge of a signal of rectangular shape delivered at its at least one input, a single incrementation signal for up counting one unit in said counter;

said control circuit means including means for delivering in response to one of said readout orders transmitted from said computer and concerning one word of the information, the signal of rectangular shape to said at least one input of said trigger circuit for storing in said empty register having the lowest serial number, the word transmitted through said second input of its associated one of said logic OR circuits; and additional switching means provided at least between register inputs of a first one of said memories and the corresponding logic OR circuit, of which an output is connected to said register inputs of said first memory, for switching to a memory having a serial number higher than that of said first memory, a word of information, which is transmitted via one of said two inputs of said associated logic OR circuit corresponding to said first memory, in response to energization of the decoder output which is connected to that register having the serial number N in said first memory.

6. A data processing system according to claim 5, wherein said computer further includes means for delivering when its programme requires the storing of an information word contained in its specialized registers into one of said buffer memories in aforesaid signal of rectangular shape to said at least one input of said trigger circuit, in order to store, in said empty register having the lowest serial number the information word transmitted through said first input of said associated logic OR circuit.

* * * * *